April 30, 1968 F. HIMMEL 3,380,765
PIPE UNION
Filed Nov. 27, 1964 8 Sheets-Sheet 1
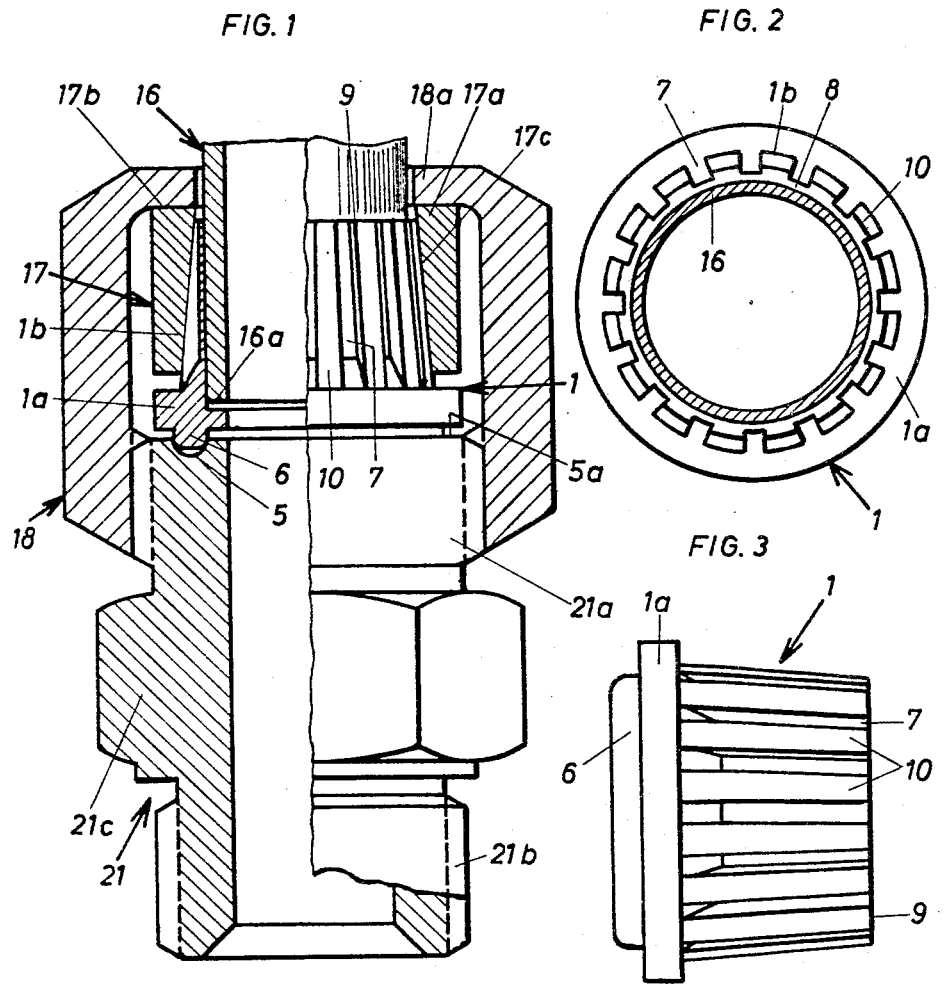
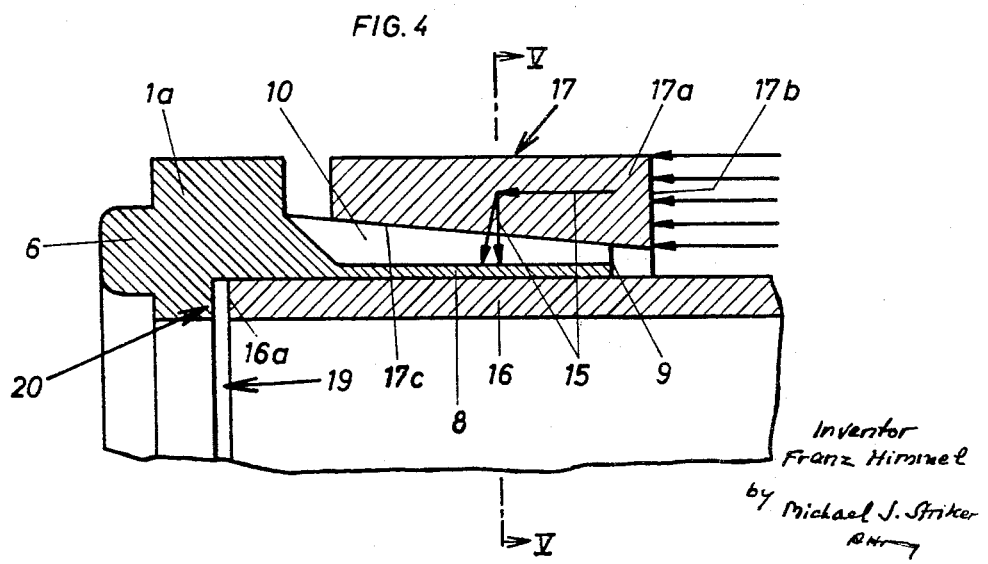
Inventor
Franz Himmel
by Michael J. Striker April 30, 1968     F. HIMMEL     3,380,765

PIPE UNION

Filed Nov. 27, 1964     8 Sheets-Sheet 2

Inventor
Franz Himmel
by Michael J. Striker
Atty

April 30, 1968      F. HIMMEL      3,380,765

PIPE UNION

Filed Nov. 27, 1964      8 Sheets-Sheet 3

Inventor
Franz Himmel
by Michael J. Anker
Atty

201 C
207 c

April 30, 1968   F. HIMMEL   3,380,765
PIPE UNION
Filed Nov. 27, 1964   8 Sheets-Sheet 5

Inventor
Franz Himmel
by Michael J. Striker
Atty

April 30, 1968 F. HIMMEL 3,380,765
PIPE UNION
Filed Nov. 27, 1964 8 Sheets-Sheet 8

Inventor
Franz Himmel
by Michael J. Striker
Atty

United States Patent Office 3,380,765
Patented Apr. 30, 1968

3,380,765
PIPE UNION
Franz Himmel, Schliersee, Germany, assignor to Dilo-Gesellschaft, Drexler & Co., Babenhausen, Schwaben, Germany
Filed Nov. 27, 1964, Ser. No. 414,307
Claims priority, application Germany, Nov. 26, 1963, D 43,031; July 1, 1964, D 44,809
36 Claims. (Cl. 285—331)

The present invention relates to pipe unions. More particularly, the invention relates to a pipe union which is free of rubber gaskets, rubber washers and similar readily deformable but short-lived sealing elements.

It is an important object of the present invention to provide an improved pipe connection or pipe union which forms a highly reliable seal between a pair of interconnected pipes and whose sealing action remains satisfactory within a very wide pressure and temperature range.

Another object of the invention is to provide a pipe union of the just outlined characteristics wherein a pair of pipes may be connected to each other without resorting to welding, soldering, brazing and similar operations which might affect the surfaces and/or the material of the pipes.

A further object of the invention is to provide a pipe union which may be accommodated within a very small area, which can be taken apart and reassembled as often as desired without affecting its sealing action, which is constructed and assembled in such a way that its components will neither scratch nor otherwise deface or damage the pipes which are connected thereby, and which can be furnished in any desired size to provide a highly satisfactory connection between pipes of smaller and/or larger internal or external diameter, which may form a reducer between pipes of different diameters, and which can be mass-produced of readily available wear-resistant materials.

An additional object of the invention is to provide a pipe union which forms a highly satisfactory seal between a pair of pipes which are free to swivel with reference to each other, whose sealing action may be adjusted without necessitating even partial disassembly of its parts, which may be utilized to provide a highly satisfactory fluidtight connection between a pair of axially spaced pipes, and which may be used to connect pipes whose end faces are of irregular configuration and are not perpendicular to the axis of the union.

A concomitant object of the invention is to provide improved sealing members which may be utilized in a union of the above outlined characteristics.

Still another object of the invention is to provide a union wherein the pipes need not be rotated if the operator desires to assemble or to dismantle the connection therebetween.

A further object of the instant invention is to provide a pipe union wherein at least one of the interconnected pipes may be sealed in two or more axially spaced zones to prevent leakage of a fluid even if one of the seals happens to be defective.

An additional object of the present invention is to provide a pipe union which may be utilized in connection with exceptionally strong as well as in connection with highly sensitive pipes, which may be utilized to connect pipes which exhibit minimal resistance to twisting or axial stresses, and which may be manipulated by semiskilled or even unskilled persons.

Another object of the invention is to provide a pipe union of the above outlined characteristics wherein a single manipulation suffices to bring about two different sealing actions.

A further object of the invention is to provide a pipe union which consists of long-lasting, wear-resistant component parts and which will produce at least two highly satisfactory sealing actions even though the material of its parts need not be deformed beyond elastic limits.

An additional object of the invention is to provide a pipe union which can be readily substituted for pipe connections of conventional design.

Briefly stated, one feature of my invention resides in the provision of a pipe union comprising a first pipe having a terminal portion provided with a smooth external surface which is snugly fitted into a first tubular sealing member consisting of radially compressible metallic material and having a spherical or conical peripheral surface provided with elongated ribs and grooves to enhance the compressibility thereof, a second tubular sealing member whose conical internal surface snugly receives the peripheral surface of the first sealing member, a second pipe having an end face which abuts against the end portion of one of the sealing members, and disengageable coupling means operatively connected with the second pipe and with one of the sealing members to urge the second pipe in sealing engagement with the end portion of the one sealing member whereby the conical internal surface effects radial compression of the first sealing member within the elastic limits of its material and maintains the first sealing member in sealing engagement with the terminal portion of the first pipe.

The coupling means may comprise a nut which meshes with external threads on the second pipe and comprises a collar which engages one of the sealing members in such a way that, when the nut is driven home, one of the sealing members is shifted axially with reference to the other sealing member in a sense to drive the first sealing member into the second sealing member.

The novel features which are considered as characteristic of the invention are set forth in particular in the appended claims. The improved pipe union itself, however, both as to its construction and the mode of assembling the same, together with additional features and advantages thereof, will be best understood upon perusal of the following detailed description of certain specific embodiments with reference to the accompanying drawings, in which:

FIG. 1 is a partly elevational and partly axial sectional view of a pipe union which is constructed and assembled in accordance with a first embodiment of my invention;

FIG. 2 is an end elevational view of a sleevelike inner tubular sealing member which is utilized in the pipe union of FIG. 1;

FIG. 3 is a side elevational view of the sealing member;

FIG. 4 is an enlarged fragmentary axial sectional view of the pipe union which is shown in FIG. 1;

Figure 5:
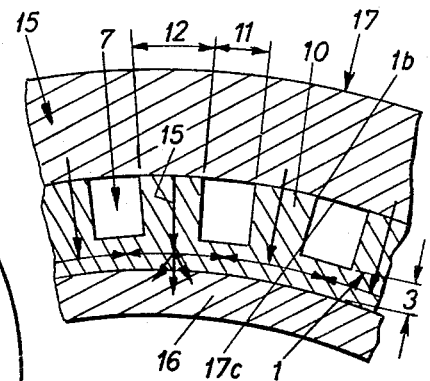
FIG. 5 is an enlarged transverse section as seen in the direction of arrows from the line V—V of FIG. 4.

Referring to FIG. 1, there is shown a pipe union which is constructed in accordance with a first embodiment of my invention. This pipe union connects a first pipe 21 with a second pipe 16. In the present instance, the pipe 21 is a short nipple having external threads 21a, 21b at each of its ends and an end face 5a provided with an annular recess 5 of semicircular cross section. The median portion 21c of the pipe 21 is formed with six facets to facilitate engagement with a wrench or another tool which serves to drive the threads 21b into the internally threaded end portion of a further pipe, not shown.

The second pipe 16 is without external threads and is provided with a smooth peripheral surface. The end face 16a of this second pipe may but need not be smooth, and this end face may but need not be located in a plane which is perpendicular to the axis of the pipe union. In other words, insofar as the sealing action is concerned, the finish and/or configuration of the end face 16a is of no consequence.

The means for providing a fluidtight seal between the pipes 16, 21 comprises two metallic tubular sealing members 1, 17. For convenience, the inner sealing member 1 will be called a sleeve and the outer sealing member 17 will be called a cylinder. The bore of the sleeve 1 is such that it receives the terminal portion of the pipe 16 with a minimum of clearance; also, the internal surface of the sleeve 1 is smooth to avoid scratching of the pipe 16.

The lower end portion 1a of the sleeve 1 extends beyond the cylinder 17 and beyond the pipe 16 and is provided with an annular projection 6 which extends into the recess 5 and is dimensioned in such a way that the pipe 21 and the projection 6 will form a fluidtight seal when the sleeve 1 is subjected to axial stresses in a sense to move it toward the end face 5a or when the pipe 21 subjected to axial stresses which act upwardly, as viewed in FIG. 1.

The cylinder 17 comprises an end portion 17a which extends beyond the adjacent end face 9 of the sleeve 1, and the end face 17b of this end portion 17a is engaged by the inwardly extending annular flange 18a of a coupling nut 18 whose threads mesh with the threads 21a of the pipe 21.

In accordance with a very important feature of the present invention, the cylinder 17 is provided with a conical internal surface 17c which diverges in a direction toward the end portion 1a, and the sleeve 1 is provided with a complementary conical peripheral surface 1b having longitudinally extending grooves 7 which are separated by ribs 10, see also FIGS. 2 and 3. The cylindrical portion 8 of the sleeve 1 (see FIG. 2) is comparatively thin and telescopically receives the terminal portion of the pipe 16. The material of the sleeve 1 is a metal which is compressible within elastic limits, and such compressibility suffices to provide a highly satisfactory seal all around the terminal portion of the pipe 16 when the nut 18 is driven home with sufficient force to compress the cylindrical portion 8 radially inwardly. Such compression also suffices to retain the terminal portion of the pipe 16 with requisite friction to prevent separation of the union in response to a pull upon the exposed part of the pipe 16. The thickness of the ribs 10 diminishes in a direction from the end portion 1a toward the end face 9 of the sleeve. At the end face 9, the thickness of the ribs 10 (as seen in the radial direction of the sleeve 1) may but need not be zero.

FIG. 4 shows that the cylindrical portion 8 (hereinafter called muff) is of constant wall thickness, and FIG. 5 shows that the grooves 7 and ribs 10 are of rectangular cross section. In the embodiment of FIGS. 1 to 5, the width 11 of the grooves 7 (as seen in the circumferential direction of the sleeve 1) approximates or equals the width 12 of the ribs 10. Also, the thickness 3 of the muff 8 is less than the depth of a groove 7. Such relationship between the dimensions of the ribs 10, grooves 7 and muff 8 is satisfactory for many purposes but may be changed as will be described in connection with FIGS. 5a and 5b.

The minimum internal diameter of the cylinder 17 is less than the minimum external diameter of the sleeve 1, see particularly FIG. 4. Thus, the end face 9 of the sleeve is spaced from the end face 17b of the cylinder. The conicity of the surfaces 1b, 17c will depend on many factors, i.e., on the wall thickness of the cylinder 17 and/or sleeve 1 and also whether or not the cylinder and sleeve should form a self-locking unit. The end face 16a of the pipe 16 may but need not abut against the internal shoulder 20 of the sleeve 1. The fact that there exists a clearance 19 between the end face 16a and the shoulder 20 is of no consequence insofar as the sealing action of the union is concerned.

In assembling the pipe union of FIG. 1, the operator attaches the pipe 21 to a longer pipe, not shown, and thereupon places the sleeve 1 against the end face 5a so that the projection 6 overlies the recess 5. In the next step, the cylinder 17 is slipped onto the ribs 10 and the terminal portion of the pipe 16 is inserted into the sleeve 1 so that it is surrounded by the muff 8. In the final step, the operator slips the nut 18 over the pipe 16 and cylinder 17 and rotates the nut to mesh with the threads 21a until the cylinder effects sufficient radial compression of the muff 8 to provide a complete annular seal between the pipe 16 and sleeve 1. At the same time, the cylinder 17 transmits axial stresses which force the projection 6 into the recess 5 and insure that the sleeve 1 and pipe 21 form a circumferentially complete seal. In other words, and as shown by arrows 15 in FIGS. 4 and 5, the collar 18a of the nut 18 will produce two types of stresses including radial stresses which cause radial compression of the muff 8 and axial stresses which cause penetration of the projection 6 into the recess 5 of the pipe 21. This completes the assembly of the pipe union.

It is clear that the nut 18 may be slipped over the cylinder 17 before the pipe 16 is inserted into the bore of the muff 8.

Figure 5A:
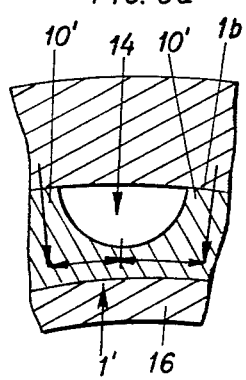
FIG. 5a is a similar transverse section through a different pipe union which comprises a modified inner sealing member.

Referring to FIG. 5a, there is shown a portion of a modified sleeve 1' having a conical peripheral surface 1b' which is provided with axially extending grooves 14 of semicircular cross section. Each such groove is flanked by two ribs 10' whose sides are of concave outline.

Figure 5B:
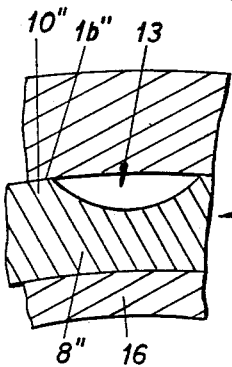
FIG. 5b is further transverse section through a third pipe union which utilizes an inner sealing member having longitudinally extending grooves of substantially semi-elliptical cross section.

FIG. 5b shows a portion of a third sleeve 1" whose peripheral surface 1b" is provided with comparatively shallow but wide substantially semielliptical grooves 13 flanked by ribs 10". It will be noted that, while the major portion of the sleeve 1, 1' or 1" is grooved, the grooves do not extend all the way through the muff so that the muff is a circumferentially complete annular body. In FIG. 5b, the wall thickness of the muff 8" exceeds the depth of the groove 13.

Figure 6:
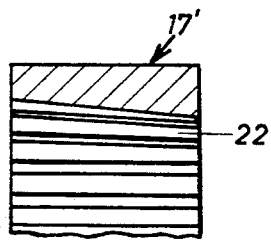
FIG. 6 is a fragmentary axial section through an outer tubular sealing member which may be used in the pipe union of my invention.

The internal conical surface 17c of the cylinder 17 is smooth. However, this cylinder may be replaced by a cylinder 17', shown in FIG. 6, whose internal surface is provided with axially extending ribs 22 which may enter the grooves of the sleeve 1 to prevent angular displacement of the cylinder. The ribs 22 may but need not completely fill the corresponding grooves of the sleeve. As a rule, there is no need to rotate the cylinder with reference to the sleeve.

Figure 6A:
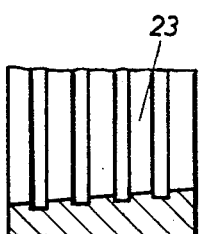
FIG. 6a is a similar fragmentary axial section through a modified outer sealing member.

FIG. 6a shows a third cylinder 17" whose internal surface is provided with circumferentially extending annular ribs 23. It is clear that the cylinder may be provided with inclined ribs or with ribs 22 and 23. The ribs 22, 23 reduce friction between the sleeve 1 and the cylinder 17' or 17".

Figure 7:
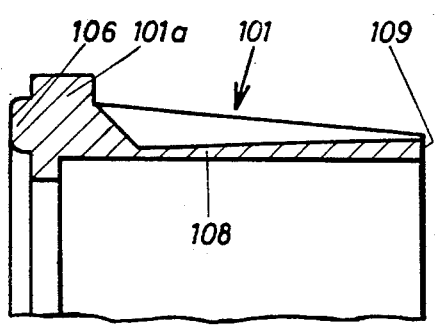
FIG. 7 illustrates in axial section a portion of an inner sealing member whose pipe-engaging cylindrical portion is of gradually changing wall thickness.

FIG. 7 illustrates a portion of a sleeve 101 whose muff 108 is of varying wall thickness, i.e., the wall thickness of the muff increases gradually in a direction from the end portion 101a toward the end face 109. The configuration of the annular projection 106 is the same as that of the projection 6 shown in FIG. 1.

Figure 7A:
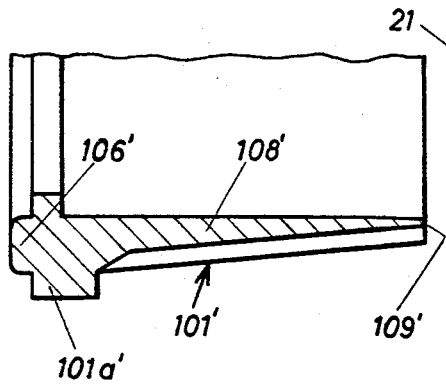
FIG. 7a is a similar fragmentary axial section through an inner sealing member which constitutes a slight modification of the sealing member shown in FIG. 7.

The sleeve 101' of FIG. 7a comprises a muff 108' whose wall thickness increases gradually from the end face 109' toward the end portion 101a'. This end portion comprises an annular projection 106'.

Figure 8:
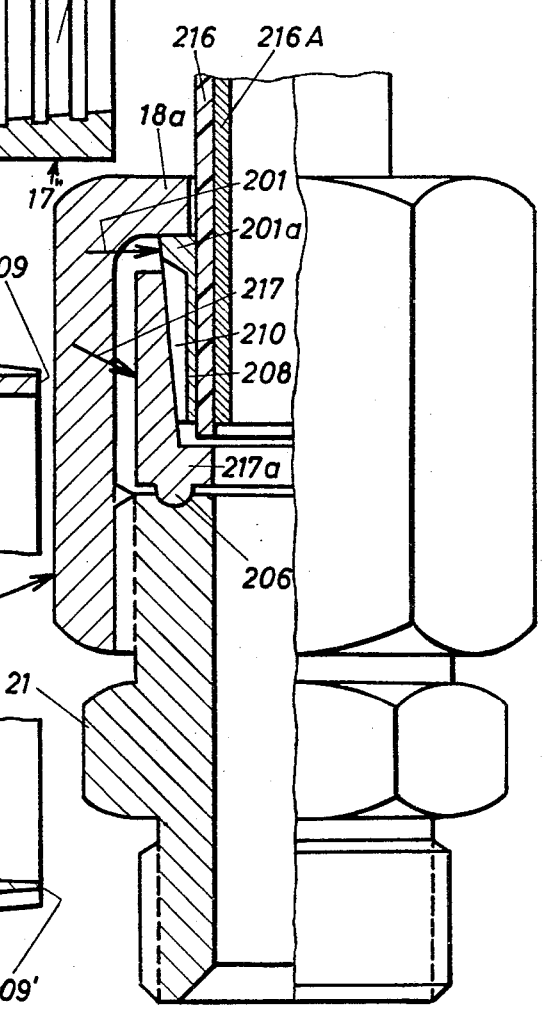
FIG. 8 is a partly elevational and partly axial sectional view of a pipe union wherein the outer sealing member forms an annular seal with one of the pipes.

Referring now to FIG. 8, there is shown a pipe union which is somewhat different from that of FIG. 1, mainly because the collar 18a of the coupling nut 18 engages the end portions 201a of the sleeve 201 and the end portion 217a of the cylinder 217 comprises an annular projection 206 which extends into the annular recess of the pipe 21. The pipe 216 consists of nylon or another readily deformable material and therefore, the union comprises a tubular stiffener 216A which is inserted into the terminal portion of the pipe 216 to prop it from inside and to prevent collapse of such terminal portion when the nut 18 is applied with requisite force to insure that the internal surface of the muff 208 forms a complete annular seal around the pipe 216. Otherwise the configuration of the sleeve 201 is analogous to that of the sleeve 1, and the configuration of the cylinder 217 is analogous to that of the cylinder 17. It will be noted that, in each of the embodiments shown in FIGS. 1 and 8, an end portion of the cylinder extends beyond the sleeve and an end portion of the sleeve extends beyond the cylinder so that one of these end portions may bear against the pipe 21 and the other end portion may be engaged by the nut 18. Also, the conical peripheral surface of the sleeve invariably diverges in the direction toward that end portion which extends beyond the cylinder, and the conical internal surface of the cylinder invariably converges in a direction toward that end portion which extends beyond the sleeve.

Figure 9:
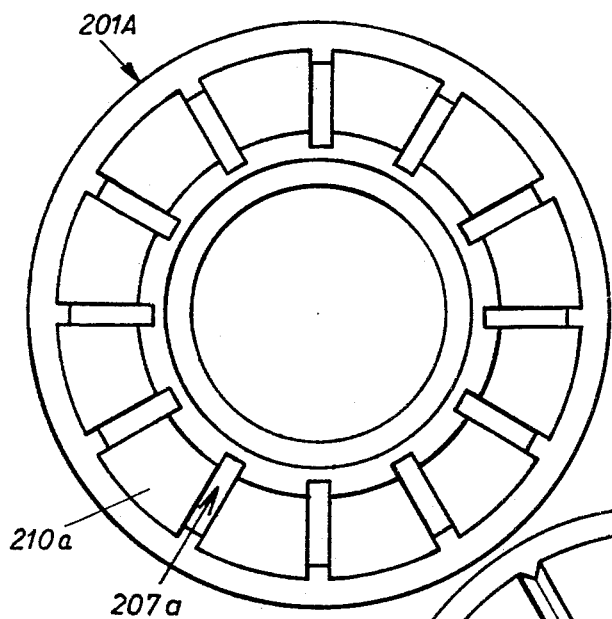
FIG. 9 is an end elevational view of an inner sealing member with radially extending peripheral grooves of rectangular cross section.
Figure 10:
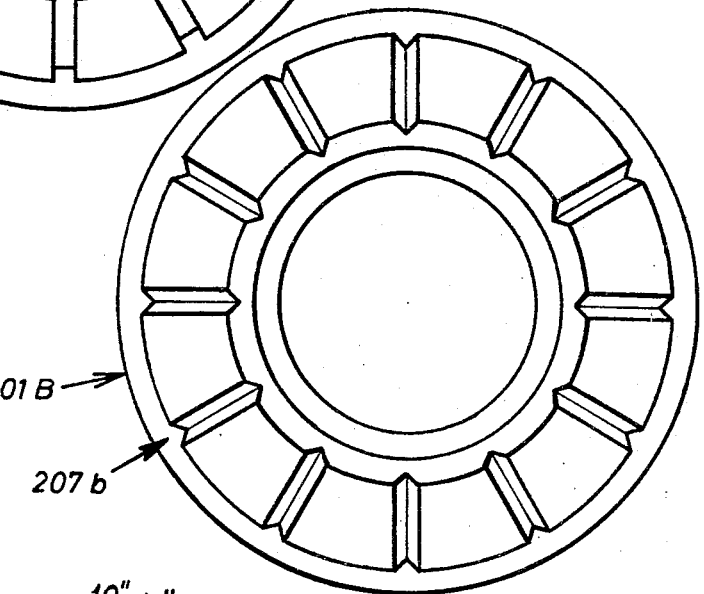
FIG. 10 is a similar end elevational view of an inner sealing member with radially extending grooves of triangular cross section.
Figure 11:
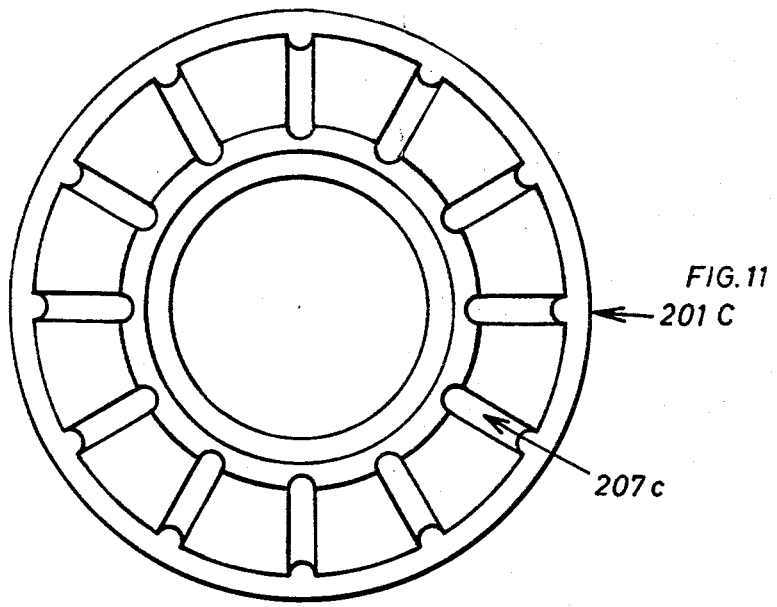
FIG. 11 is an end elevational view of an inner sealing member with radially extending peripheral grooves of semicircular cross section.
Figure 12:
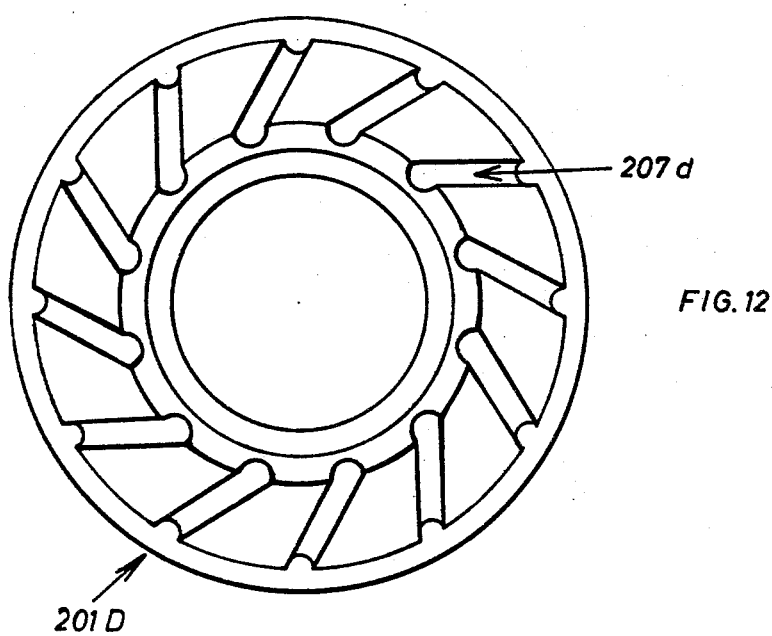
FIG. 12 is an end elevational view of an inner sealing member with peripheral grooves which are substantially tangential to the central cylindrical portion of the sealing member.

FIGS. 9 to 12 illustrate four additional types of sleeves which may be used in the pipe union of my invention. The sleeve 201A of FIG. 9 is provided with widely spaced radially extending grooves 207a of rectangular cross section, i.e., the width of each rib 210a exceeds several times the width of a groove 207a. The sleeve 201B of FIG. 10 is provided with grooves 207b which are of triangular cross section and are located in radial planes, the same as the grooves 207a of FIG. 9. The grooves 207c of the sleeve 201C shown in FIG. 11 are of semicircular cross section and are disposed in radial planes. The grooves 207d of the sleeve 201D shown in FIG. 12 are of semicircular cross section but are disposed in planes which do not intersect the axis of the sleeve 201D. In other words, the grooves 207d cross in space the axis of the sleeve 201D. It is obvious that the grooves 207a and/or 207b may be arranged in the same way as the grooves 207d of FIG. 12. In all instances, the grooves facilitate radial compression of the muff to provide a fluidtight seal around the terminal portion of the pipe 16 or 216.

Figure 13:
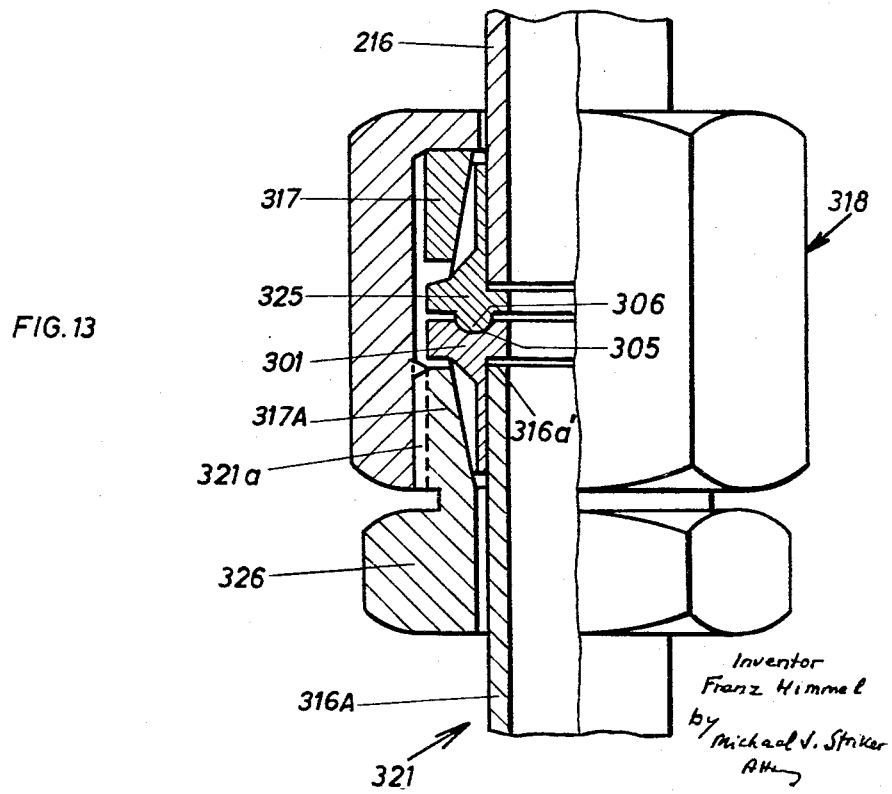
FIG. 13 is a partly elevational and partly axial sectional view of a pipe union which comprises two inner sealing members and two outer sealing members.

FIG. 13 shows a further pipe union which comprises two sleeves 301, 325, two cylinders 317, 317A, a coupling nut 318, and a pipe 316. The parts 301, 317A, constitute two components of a composite pipe 321 which also includes a pipe 316A. The cylinder 317A comprises a faceted portion 326 which is engaged by a first tool when the nut 318 is rotated by a second tool. The threads 321a of the cylinder 317A correspond to the threads 21a of the pipe 21 shown in FIG. 1. The pipe union of FIG. 13 is of particular advantage when the end face 316a' of the pipe 316A cannot be provided with a recess to receive the projection 306 of the sleeve 325. The sleeve 325 and cylinder 317 cooperate in the same way as the sleeve 1 and cylinder 17 or the sleeve 301 and cylinder 317A. The enlarged end portion of the sleeve 301 (i.e., that end portion which extends beyond the cylinder 317A) is provided with an annular recess 305 to receive a portion of the projection 306 which is provided on the enlarged end portion of the sleeve 325. FIG. 13 shows that the nut 318 may be coupled with one of the cylinders 317, 317A when the two sleeves 301, 325 cooperate to provide a seal in a plane which is perpendicular to the axis of the pipe union. It is clear that the position of the recess 305 and projection 306 may be reversed, i.e., the projection may be provided on the sleeve 301.

Figure 14:
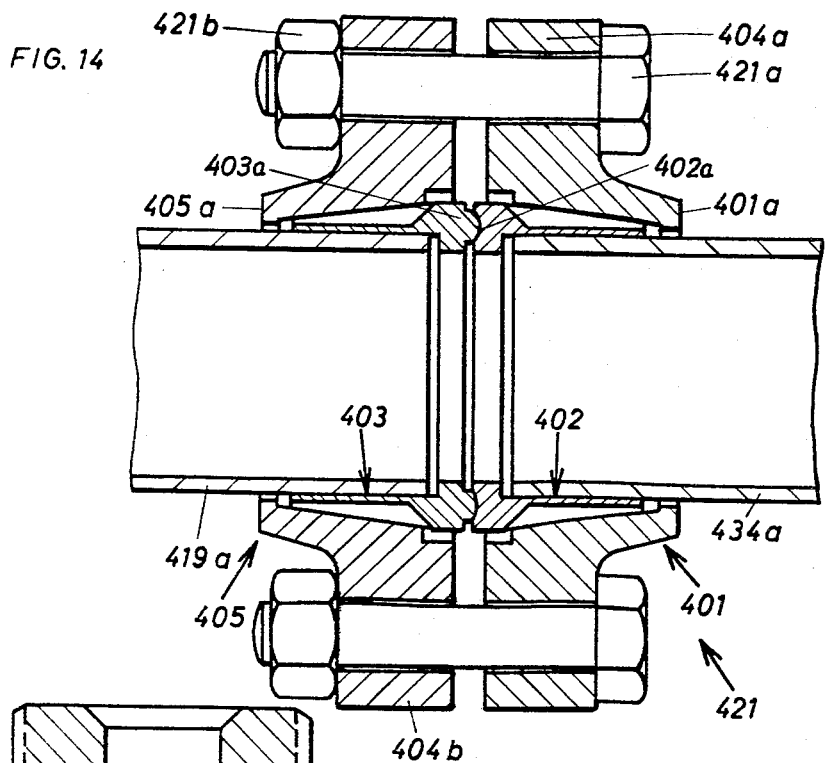
FIG. 14 is an axial section through a pipe union which is similar to the one shown in FIG. 13.

The pipe union of FIG. 14 is similar to the union of FIG. 13. It comprises two coaxial sleeves 402, 403 which are respectively provided with an annular recess 402a and an annular projection 403a, two cylinders 401, 405, two pipes 419a, 434a, and coupling means including bolts 421a and nuts 421b. The bolts extend through aligned bores provided in annular flanges 404a, 404b of the cylinders 401, 405. The main difference between the pipe unions of FIGS. 13 and 14 resides in that the nuts 421b do not engage the end face 401a or 405a. It will be seen that the parts 434a, 401, 402, 421a together constitute a composite pipe 421 which corresponds to the pipe 21 of FIG. 1. It is also clear that the flanges 404a, 404b may be replaced by a nut which engages the end face 405a and meshes with external threads of a cylinder similar to cylinder 401 but having a set of external threads.

The axial length of the cylinders 401, 405 need not exceed the axial length of their flanges 404a, 404b.

Figure 15:
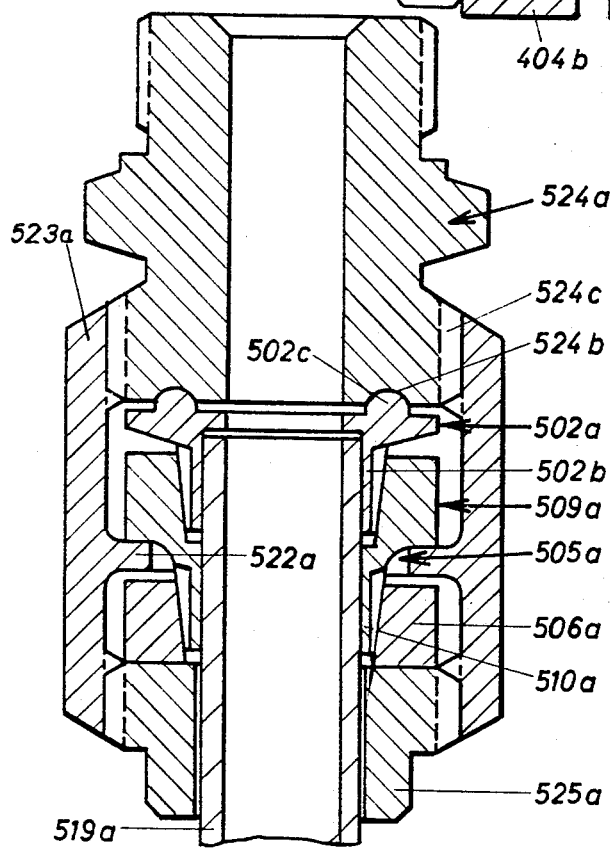
FIG. 15 is an axial section through a pipe union wherein one of the pipes is in sealing engagement with two inner sealing members.
Figure 17:
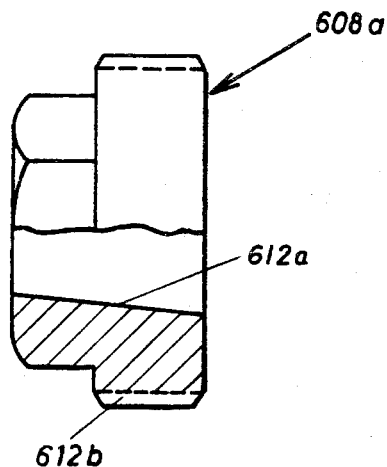
FIG. 17 is a similar view of a further outer sealing member which may be utilized in the pipe union of FIG. 15.

Referring now to FIG. 15, there is shown a pipe union which comprises a first pipe 524a provided with an annular recess 524b and with external threads 524c which mesh with internal threads of a coupling nut 523a having an annular collar 522a. The terminal portion of a second pipe 519a is received in the muff 502b of a first sleeve 502a which comprises an annular projection 502c extending into the recess 524b. The sleeve 502a cooperates with a cylinder 509a which is engaged by the collar 522a of the nut 523a. The cylinder 509a is integral with a second sleeve 505a which cooperates with a second cylinder 506a. This second cylinder 506a abuts against a second coupling nut 525a whose external threads mesh with internal threads at the lower end of the nut 523a. The sleeve 505a and cylinder 509a form an integral unit. The pipe union of FIG. 15 provides two annular seals around the pipe 519a, i.e., the peripheral surface of this pipe is clamped by the muff 502b of the sleeve 502a and by the muff 510a of the sleeve 505a. The nut 525a may be replaced by an internally threaded nut which meshes with external threads of a clamping nut corresponding to the nut 523a. Also, the nut 525a may be omitted and the nut 523a is then coupled to the cylinder 506a by bolts and nuts in a manner substantially as shown in FIG. 14. Alternatively, the cylinder 506a and nut 525a may be replaced by a one-piece cylinder 608a of the type shown in FIG. 17. The externally threaded portion 612b of the cylinder forms a nut which constitutes an element of the coupling means for the pipe union and may mesh with the nut 523a. The conical internal surface 612a will surround the ribs of the sleeve 505a.

Figure 16:
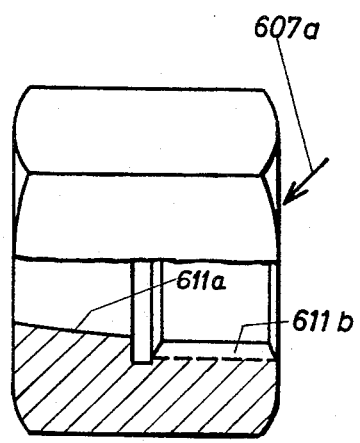
FIG. 16 is a partly elevational and partly axial sectional view of an outer sealing member which may be utilized in the pipe union of FIG. 15.

FIG. 16 shows a modified cylinder 607a a portion 611b of which resembles a nut and which may replace the parts 506a, 525a of FIG. 15 if the lower end portion of the nut 523a is provided with external threads so that it may mesh with the threaded portion 611b of the cylinder 607a. The conical surface 611a of the cylinder 607a may engage the ribs of the sleeve 505a.

The pipe union of FIG. 15 could be modified by adding one or more pairs of sleeve-cylinder combinations so that the pipe 519a would be held in sealing engagement with three or more grooved sleeves.

Figure 18:
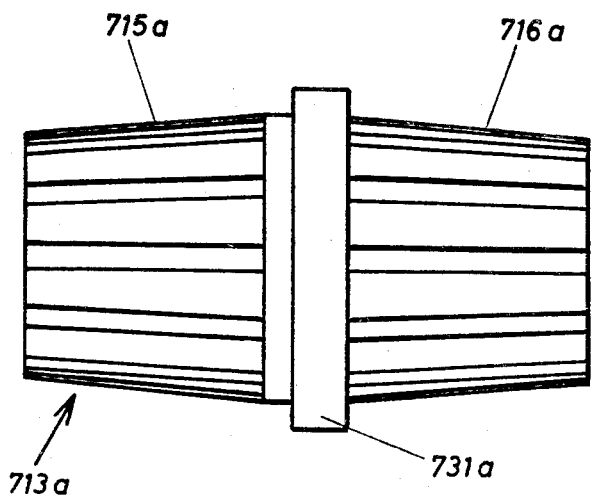
FIG. 18 is a side elevational view of a twin sealing member which comprises two miror symmetrical conical portions.

FIG. 18 shows a twin sleeve 713a which may replace the sleeves 402, 403 of the pipe union shown in FIG. 14. The sleeve 713a comprises two mirror symmetrical conical portions 715a, 716a whose diameters decrease in directions toward the respective ends of the sleeve. The two conical portions 715a, 716a are ribbed and grooved substantially in the same way as shown in FIG. 3; however, it is obvious that the ribs and groves on the conical portion 715a may be different from the ribs and grooves of the conical portion 716a.

Figure 19:
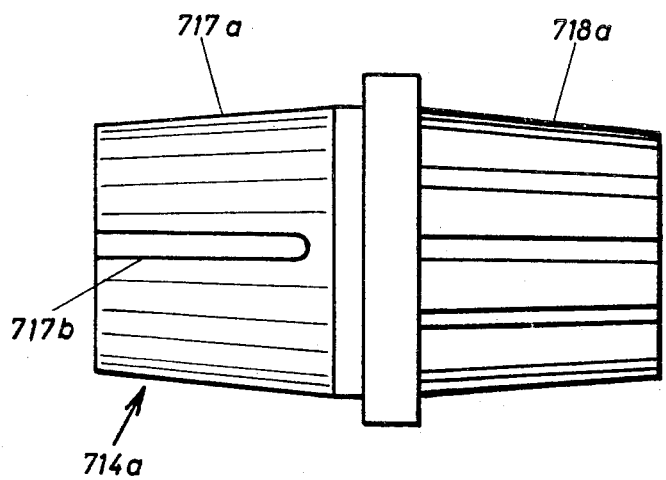
FIG. 19 is a similar side elevational view of a different twin sealing member.

The twin sleeve 714a of FIG. 19 comprises a first conical portion 718a which is identical with the conical portion 716a of the sleeve 713a and a second conical portion 717a which has only two ribs 717b or only two grooves. In fact, the conical portion 717a may be without any ribs and grooves.

Figure 20:
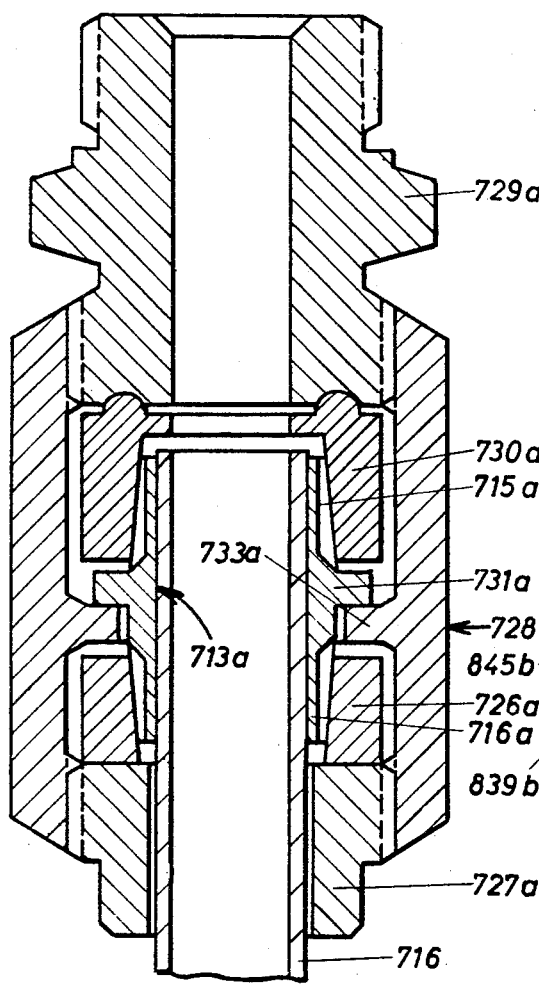
FIG. 20 is an axial section through a pipe union which utilizes the twin sealing member of FIG. 18.

The manner in which a twin sleeve may be put to use in my improved pipe union is shown in FIG. 20. The pipe 729a corresponds to the pipe 21 of FIG. 1 or to the pipe 524a of FIG. 15. This pipe is provided with external threads which mesh with internal threads of a coupling nut 728a having a collar 733a which engages one end face of a centrally located flange 731a on a twin sleeve 713a. The conical portion 715a of the sleeve 713a cooperates with a first cylinder 730a which is in sealing engagement with the pipe 729a, and the conical portion 716a of the sleeve 713a cooperates with a second cylinder 726a which is engaged by a nut 727a meshing with the nut 728a. The cylinder 726a and nut 727a may be replaced by the nut 608a of FIG. 17. The muffs of the conical portions 715a, 716a will be compressed radially when the nut 727a is driven into the nut 728a with a force which suffices to exert a radial pressure on the ribs of the conical portion 716a and when the nut 728a is screwed on the pipe 729a with a force which suffices to effect compression of the conical portion 715a and to provide a fluid-tight seal between the projection of the conical portion 715a and the end face of the pipe 729a. The muffs of the twin sleeve 713a form two annular seals about the terminal portion of a second pipe 716. The sleeve 713a may be replaced by the sleeve 714a of FIG. 19.

Figure 21:
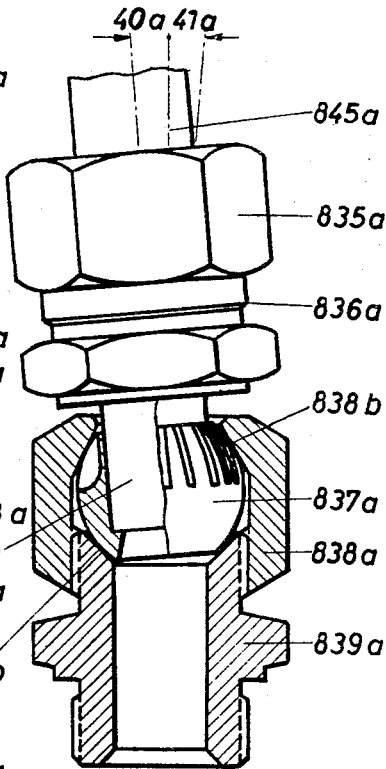
FIG. 21 is a partly elevational and partly axial sectional view of a pipe union wherein one of the pipes and the two sealing members form a universal joint.
Figure 22:
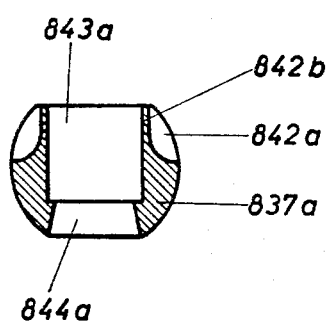
FIG. 22 is an axial section through the inner sealing member of the pipe union shown in FIG. 21.

Referring to FIG. 21, there is shown a pipe union which forms a universal joint. The union comprises a first pipe 845a, a second pipe 845b which is connected to the pipe 845a by a union of the type shown, for example, in FIG. 1 and including a coupling nut 936a and a nipple 935a, and a third pipe in the form of a nipple 839a. The pipes 845b, 839a are connected to each other by a sleeve 837a and a cylinder 838a. It is clear that the parts 845b, 835a may be omitted and that the sleeve 837a may be slipped directly onto the end portion of the pipe 845a. In accordance with an important feature of my invention, the peripheral surface of the sleeve 837a is of spherical outline, see particularly FIG. 22, and is provided with grooves 842a surrounding a muff 842b. The cylinder 838a is provided with a conical internal surface 838b which engages the grooved portion of the sleeve 837a and compresses the muff 842b radially inwardly to form a seal around the terminal portion of the pipe 845b. The bore 843a of the sleeve 837a receives the terminal portion of the pipe 845b. The grooves 842a are preferably of varying depth but the thickness of the muff 842b is preferably constant. The lower end portion 844a of the bore 843a is conical and diverges in a direction away from the pipe 845b to offer less resistance to the flow of a fluid which is conveyed from the pipe 845a to the pipe 839a. The threads of the cylinder 838a mesh with external threads at the upper end of the pipe 839a and the cylinder thereby deforms the muff 842b within elastic limits of the metallic material of which the sleeve 837a consists so that the muff forms a complete annular seal around the terminal portion of the pipe 845b. The lower end portion of the sleeve 837a forms an annular seal with the end face of the pipe 839a.

It will be noted that the sleeve 837a cooperates with the cylinder 838a and pipe 839a to form two fluidtight seals even if the axis of the pipe 845a is inclined with reference to the axis of the pipe 839a. The angles 40a, 41a indicate the extent to which the pipe 845a may swivel from a neutral position in which its axis coincides with the axis of the pipe 839a.

The entire peripheral surface of the sleeve 837a need not be of spherical outline. Thus, it will often suffice if the sleeve 837a comprises a convex surface which is grooved and engages the internal surface 838b of the cylinder 838a. The remainder of the peripheral surface on the sleeve 837a is then of cylindrical, conical or polygonal outline. Alternatively, the peripheral surface of the sleeve 837a may comprise two convex end portions which engage the internal surface 838b and the conical end face 839b of the pipe 839a, and a median portion of conical, cylindrical or polygonal outline.

In some instances, the wall thickness of the muff 842b may increase toward the conical end face 839b or toward the conical surface 838b.

Figure 23:
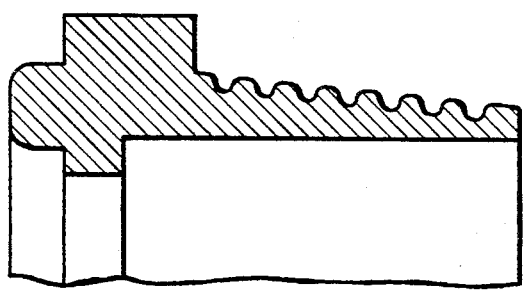
FIG. 23 illustrates an inner sealing member whose peripheral surface is of undulate cross section.
Figure 24:
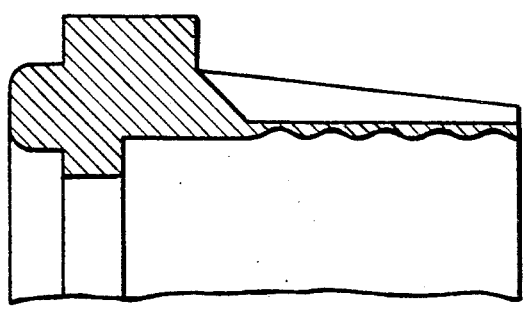
FIG. 24 illustrates an outer sealing member whose internal surface is of undulate cross section.

FIG. 23 shows a sleeve whose conical peripheral surface is of undulate cross section. The cylinder of FIG. 24 is provided with a conical internal surface of undulate cross section. The constructions shown in FIGS. 23 and 24 reduce friction between the sleeve and the cylinder when the sleeve is driven into the cylinder so that the internal diameter of its muff decreases.

A very important feature of my invention is that the sleeve will form a highly satisfactory seal around the terminal portion of a pipe even though the muff undergoes only such deformation which is within the elastic limits of its material. The compressive action is uniform because the periphery of the sleeve is ribbed. Experiments which were carried out at very high temperatures and at exceptionally high pressures indicate that the sealing action of the sleeve remains satisfactory within a wide temperature and pressure range. It was found that the pressures at which the improved sleeve still forms a satisfactory seal may exceed at least four times the maximum pressures which can be withstood by conventional metallic (hard) seals of which I am aware at this time. There is no need to weld or solder the pipes to each other and the component parts of the pipe union may be assembled or disassembled by resorting to simple and readily available tools. Also, the peripheral surfaces of the pipes are neither scratched nor otherwise damaged so that such pipes may be provided with coats of very thin and sensitive material. The pipes may consist of metallic or plastic material and the sleeve will provide a highly satisfactory seal even if the peripheral surface of the pipe which is received therein is not finished with utmost precision. The pipe union may be assembled or taken apart without necessitating complete dismantling of the pipe line in which the union is put to use and the component parts of the union may be accommodated in a very small area. Since the sleeve need not rotate with reference to the pipe which is surrounded thereby, the union may be used in connection with pipes whose material offers little resistance to torsional stresses. It was found that the improved union may also be utilized in connection with pipes which consist of synthetic plastic material and are provided with internal and/or external coats of thin and highly sensitive mesh consisting of nylon or the like.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a pipe union, a first pipe having a terminal portion; a first tubular sealing member snugly receiving said terminal portion and consisting of radially compressible material, said first sealing member having a leading end and a peripheral surface provided with elongated ribs and, to enhance the compressibility thereof, with axially extending open grooves which have open ends located at said leading end; a second tubular sealing member having a conical internal surface snugly receiving at least a portion of said peripheral surface, one of said sealing members having an end portion extending beyond said terminal portion and said grooves extending at least along said portion of said peripheral surface; a second pipe abutting against said end portion; and coupling means operatively connected with said second pipe and with one of said sealing members for urging said leading end of said first sealing member deeper into said second sealing member to compress said first sealing member into sealing engagement with said terminal portion.

2. In a pipe union, a first pipe having a terminal portion; a first tubular sealing member snugly receiving said terminal portion and consisting of radially compressible metallic material, said sealing member having a leading end and a peripheral surface provided with elongated ribs and, to enhance the compressibility thereof, with axially extending open grooves which have open ends located at said leading end; a second tubular sealing member having a conical internal surface snugly receiving at least a portion of the peripheral surface of said first sealing member, one of said sealing members having an end portion extending beyond the other sealing member and beyond said terminal portion and said grooves extending at least along said portion of said peripheral surface; a second pipe abutting against said end portion; and coupling means operatively connected with said second pipe and with one of said sealing members for urging said end portion in sealing abutment with said second pipe and for simultaneously urging said leading end of said first sealing member deeper into said second sealing member so as to compress said first sealing member within the elastic limits of its material and into sealing engagement with said terminal portion.

3. In a pipe union, a first pipe having a terminal portion; a first tubular sealing member snugly receiving said terminal portion and consisting of radially compressible material, said first sealing member having a leading end and a peripheral surface provided with olternating elongater ribs and, to enhance the compressibility thereof, with axially extending open grooves which have open ends located at said leading end, said first sealing member further having a smooth internal surface and said grooves extending inwardly toward but short of said internal surface; a second tubular sealing member having a conical internal surface snugly receiving at least a portion of said peripheral surface, one of said sealing members having an end portion extending beyond said terminal portion and said grooves extending at least along said portion of said peripheral surface; a second pipe abutting against said end portion; and coupling means operatively connected with said second pipe and with one of said sealing members for urging said leading end of said first sealing member deeper into said second sealing member to compress said first sealing member into sealing engagement with said terminal portion.

4. In a pipe union, a first pipe having a terminal portion; a first tubular sealing member snugly receiving said terminal portion and consisting of radially compressible material, said first sealing member having a leading end and a peripheral surface provided with elongated ribs and to enhance the compressibility thereof, with axially extending open grooves which have open ends located at said leading end, said sealing member further having a cylindrical muff surrounded by said ribs and grooves and said muff having portions of different wall thickness; a second tubular sealing member having a conical internal surface snugly receiving at least a portion of said peripheral surface, one of said sealing members having an end portion extending beyond said terminal portion and said grooves extending at least along said portion of said peripheral surface; a second pipe abutting against said end portion; and coupling means operatively connected with said second pipe and with one of said sealing members for urging said leading end of said first sealing member deeper into said second sealing member to compress said first sealing member into sealing engagement with said terminal portion.

5. A structure as set forth in claim 4, wherein the wall thickness of said muff decreases gradually from the one to the other axial end of said first sealing member.

6. In a pipe union, a first pipe having a terminal portion; a first tubular sealing member snugly receiving said terminal portion and consisting of radially compressible material, said first sealing member having a leading end and a peripheral surface provided with elongated ribs and, to enhance the compressibility thereof, with axially extending open grooves which have open ends located at said leading end, the width of said ribs exceeding the width of said grooves; a second tubular sealing member having a conical internal surface snugly receiving at least a portion of said peripheral surface, one of said sealing members having an end portion extending beyond said terminal portion and said grooves extending at least along said portion of said peripheral surface; a second pipe abutting against said end portion; and coupling means operatively connected with said second pipe and with one of said sealing members for urging said leading end of said first sealing member deeper into said second sealing member to compress said first sealing member into sealing engagement with said terminal portion.

7. In a pipe union, a first pipe having a terminal portion; a first tubular sealing member snugly receiving said terminal portion and consisting of radially compressible material, said first sealing member having a leading end and a peripheral surface provided with elongated ribs and, to enhance the compressibility thereof, with axially extending open grooves which have open ends located at said leading end, said grooves being disposed in planes passing through the axis of said sealing member; a second tubular sealing member having a conical internal surface snugly receiving at least a portion of said peripheral surface, one of said sealing members having an end portion extending beyond said terminal portion and said grooves extending at least along said portion of said peripheral surface; a second pipe abutting against said end portion; and coupling means operatively connected with said second pipe and with one of said sealing members for urging said leading end and first sealing member deeper into said second sealing member to compress said first sealing member into sealing engagement with said terminal portion.

8. In a pipe union, a first pipe having a terminal portion; a first tubular sealing member snugly receiving said terminal portion and consisting of radially compressible material, said first sealing member having a leading end and a peripheral surface provided with elongated ribs and, to enhance the compressibility thereof, with axially extending open grooves which have open ends located at said leading end, said grooves crossing in space the axis of said sealing member; a second tubular sealing member having a conical internal surface snugly receiving at least a portion of said peripheral surface, one of said sealing members having an end portion extending beyond said terminal portion and said grooves extending at least along said portion of said peripheral surface; a second pipe abutting against said end portion; and coupling means operatively connected with said second pipe and with one of said sealing member for urging said leading end of said first sealing member deeper into said second sealing member to compress said first sealing member into sealing engagement with said terminal portion.

9. In a pipe union, a first pipe having a terminal portion; a first tubular sealing member snugly receiving said terminal portion and consisting of radially compressible material, said first sealing member having a leading end and a peripheral surface provided with alternating elongated ribs and, to enhance the compressibility thereof, with axially extending open grooves which have open ends located at said leading end, said grooves being of polygonal cross section; a second tubular sealing member having a conical internal surface snugly receiving at least a portion of said peripheral surface, one of said sealing members having an end portion extending beyond said terminal portion; a second pipe abutting against said end portion and said grooves extending at least along said portion of said peripheral surface; and coupling means operatively connected with said second pipe and with one of said sealing members for urging said end portion in sealing engagement with said second pipe and for simultaneously urging said leading end of said first sealing member deeper into said second sealing member to compress said first sealing member within elastic limits of its material and into sealing engagement with said terminal portion.

10. In a pipe union, a first pipe having a terminal portion; a first tubular sealing member snugly receiving said terminal portion and consisting of radially compressible material, said first sealing member having a leading end and a peripheral surface provided with alternating elongated ribs and, to enhance the compressibility thereof, with axially extending open grooves which have open ends located at said leading end, said grooves being of substantially semicircular cross section; a second tubular sealing member having a conical internal surface snugly receiving at least a portion of said peripheral surface, one of said sealing members having an end portion extending beyond said terminal portion; a second pipe abutting against said end portion and said grooves extending at least along said portion of said peripheral surface; and coupling means operatively connected with said second pipe and with one of said sealing members for urging said end portion in sealing engagement with said second pipe and for simultaneously urging said leading end of said first sealing member deeper into said second sealing member to compress said first sealing member within elastic limits of its material and into sealing engagement with said terminal portion.

11. In a pipe union, a first pipe having a terminal portion; a first tubular sealing member snugly receiving said terminal portion and consisting of radially compressible material, said first sealing member having a leading end and a peripheral surface provided with alternating elongated ribs and grooves, to enhance the compressibility thereof, with axially extending open grooves which have open ends located at said leading end, said grooves being of substantially semielliptical cross section; a second tubular sealing member having a conical internal surface snugly receiving at least a portion of said peripheral surface, one of said sealing members having an end portion extending beyond said terminal portion and said grooves extending at least along said portion of said peripheral surface; a second pipe abutting against said end portion; and coupling means operatively connected with said second pipe and with one of said sealing members for urging said end portion in sealing engagement with said second pipe and for simultaneously urging said leading end of said first sealing member deeper into said second sealing member to compress said first sealing member within elastic limits of its material and into sealing engagement with said terminal portion.

12. In a pipe union, a first pipe having a terminal portion; a first tubular sealing member snugly receiving said terminal portion and consisting of radially compressible material, said first sealing member having a leading end and a peripheral surface of undulate outline and provided with alternating elongated ribs and, to enhance the compressibility thereof, with axially extending open grooves which have open ends located at said leading end; a second tubular sealing member having a conical internal surface snugly receiving at least a portion of said peripheral surface, one of said sealing members having an end portion extending beyond said terminal portion and said grooves extending at least along said portion of said peripheral surface; a second pipe abutting against said end portion; and coupling means operatively connected with said second pipe and with one of said sealing members for urging said end portion in sealing engagement with said second pipe and for simultaneously urging said leading end of said first sealing member deeper into said second sealing member to compress said first sealing member within elastic limits of its material and into sealing engagement with said terminal portion.

13. In a pipe union, a first pipe having a terminal portion; a first tubular sealing member snugly receiving said terminal portion and consisting of radially compressible material, said first sealing member having a leading end and a peripheral surface provided with elongated ribs and, to enhance the compressibility thereof, with axially extending open grooves which have open ends located at said leading end; a second tubular sealing member having a conical internal surface snugly receiving at least a portion of said peripheral surface, said internal surface being provided with axially extending ribs and one of said sealing members having an end portion extending beyond said terminal portion and said grooves extending at least along said portion of said peripheral surface; a second pipe abutting against said end portion; and coupling means operatively connected with said second pipe and with one of said sealing members for urging said leading end of said first sealing member deeper into said second sealing member to compress said first sealing member into sealing engagement with said terminal portion.

14. A structure as set forth in claim 13, wherein the ribs of said second sealing member extend into and at least partially fill the grooves of said first sealing member.

15. In a pipe union, a first pipe having a terminal portion; a first tubular sealing member snugly receiving said terminal portion and consisting of radially compressible material, said first sealing member having a leading end and a peripheral surface provided with elongated ribs and, to enhance the compressibility thereof, with axially extending open grooves which have open ends located at said leading end; a second tubular sealing member having a conical internal surface snugly receiving at least a portion of said peripheral surface, said internal surface being provided with circumferential ribs and grooves to reduce friction between said sealing members and one of said sealing members having an end portion extending beyond said terminal portion and said grooves extending at least along said portion of said peripheral surface; a second pipe abutting against said end portion; and coupling means operatively connected with said second pipe and with one of said sealing members for urging said leading end of said first sealing member deeper into said second sealing member to compress said first sealing member into sealing engagement with said terminal portion.

16. In a pipe union, a first pipe having a terminal portion; a first tubular sealing member snugly receiving said terminal portion and consisting of radially compressible material, said first sealing member having a leading end and a peripheral surface provided with elongated ribs and, to enhance the compressibility thereof, with axially extending open grooves which have open ends located at said leading end; a second tubular sealing member having a conical internal surface of undulate cross-sectional outline and snugly receiving at least a portion of said peripheral surface, one of said sealing members having an end portion extending beyond said terminal portion and said grooves extending at least along said portion of said peripheral surface; a second pipe abutting against said end portion; and coupling means operatively connected with said second pipe and with one of said sealing members for urging said leading end of said first sealing member deeper into said second sealing member to compress said first sealing member into sealing engagement with said terminal portion.

17. In a pipe union, a first pipe having a terminal portion; a first tubular sealing member snugly receiving said terminal portion and consisting of radially compressible material, said sealing member having a leading end and a peripheral surface provided with alternating elongated ribs and, to enhance the compressibility thereof, with axially extending open grooves which have open ends located at said leading end; a second tubular sealing member having a conical internal surface snugly receiving at least a portion of said peripheral surface, said second sealing member having an end portion extending beyond said terminal portion and grooves extending at least along said portion of said peripheral surface; a second pipe having an end face abutting against said end portion; and coupling means operatively connected with said second pipe and with one of said sealing members for urging said end portion in sealing engagement with said end face and for simultaneously urging said leading end of said first sealing member deeper into said second sealing member whereby said conical surface compresses the first sealing member into sealing engagement with said terminal portion.

18. In a pipe union, a first pipe having a terminal portion; a first tubular sealing member snugly receiving said terminal portion and consisting of radially compressible material, said sealing member having a leading end and a peripheral surface provided with alternating elongated ribs and, to enhance the compressibility thereof, with axially extending open grooves which have open ends located at said leading end; a second tubular sealing member having a conical internal surface snugly receiving at least a portion of said peripheral surface, said second sealing member having an end portion extending beyond said first sealing member and beyond said terminal portion and said grooves extending at least along said portion of said peripheral surface; a second pipe having an end face abutting against said end portion; and coupling means operatively connected with said second pipe and with one of said sealing members for urging said end portion in sealing engagement with said end face and for simultaneously urging said leading end of said first sealing member deeper into said second sealing member whereby said conical surface compresses the first sealing member into sealing engagement with said terminal portion.

19. In a pipe union, a first pipe having a terminal portion; a first tubular sealing member snugly receiving said terminal portion and consisting of radially compressible material, said sealing member having a leading end and a peripheral surface provided with alternating elongated ribs and, to enhance the compressibility thereof, with axially extending open grooves which have open ends located at said leading end, said sealing member comprising an end portion extending beyond said terminal portion and said grooves extending at least along said portion of said peripheral surface; a second tubular sealing member having a conical internal surface snugly receiving at least a portion of said peripheral surface; a second pipe having an end face abutting against said end portion; and coupling means operatively connected with said second pipe and with one of said sealing members for urging said end portion in sealing engagement with said end face and for simultaneously urging said leading end of said first sealing member deeper into said second sealing member whereby said conical surface compresses the first sealing member into sealing engagement with said terminal portion.

20. In a pipe union, a first pipe having a terminal portion provided with a smooth external surface; a first tubular sealing member snugly receiving said terminal portion and consisting of radially compressible material, said first sealing member having a leading end and a spherical peripheral surface provided with alternating ribs and, to enhance the compressibility thereof, with axially extending open grooves which have open ends located at said leading end, said first sealing member comprising an end portion extending beyond said terminal portion and said grooves extending at least along said portion of said peripheral surface; a second tubular sealing member having a conical internal surface snugly receiving at least a portion of said spherical surface; a second pipe having an outwardly diverging end face abutting against said end portion; and coupling means operatively connected with said second pipe and with one of said sealing members for urging said end portion against said end face and for simultaneously urging said leading end of said first sealing member deeper into said second sealing member so that the first sealing member contracts into sealing engagement with said terminal portion, said second pipe being free to swivel with reference to said first pipe and said first sealing member while its end face remains in sealing engagement with said end portion.

21. A structure as set forth in claim 20, wherein said first sealing member is provided with an axial bore which receives said terminal portion and wherein that portion of said bore which is located within said end portion of the first sealing member diverges in a direction away from said terminal portion.

22. In a pipe union, a first pipe having a terminal portion provided with a smooth external surface; a first tubular sealing member snugly receiving said terminal portion and consisting of radially compressible material, said first sealing member having a leading end and a spherical peripheral surface at least a portion of which is provided with alternating ribs and, to enhance the compressibility thereof, with axially extending open grooves which have open ends located at said leading end, said first sealing member comprising an end portion extending beyond said terminal portion and said grooves extending at least along said portion of said peripheral surface; a second tubular sealing member having a conical internal surface snugly receiving at least said portion of said peripheral surface; a second pipe having an outwardly diverging end face abutting against said end portion; and coupling means operatively connected with said second pipe and with one of said sealing members for urging said end portion against said end face and for simultaneously urging said leading end of said first sealing member deeper into said second sealing member so that the first sealing member contracts into sealing engagement with said terminal portion, said second pipe being free to swivel with reference to said first pipe and said first sealing member while its end face remains in sealing engagement with said end portion.

23. A structure as set forth in claim 22, wherein said first sealing member comprises a cylindrical muff which is of constant wall thickness and is surrounded by said ribs and grooves.

24. In a pipe union, a first pipe having a terminal portion; a first tubular sealing member snugly receiving said terminal portion and consisting of radially compressible material, said first sealing member having a leading end and a peripheral surface provided with elongated ribs and, to enhance the compressibility thereof, with axially extending open grooves which have open ends located at said leading end; a second tubular sealing member having a conical internal surface snugly receiving at least a portion of said peripheral surface, one of said sealing members having an end portion extending beyond said terminal portion; a second pipe abutting against said end portion and said grooves extending at least along said portion of said peripheral surface; and coupling means operatively connected with said second pipe and with one of said sealing members for urging said leading end of said first sealing member deeper into said second sealing member so as to compress said first sealing member into sealing engagement with said terminal portion and for simultaneously urging said one sealing member into sealing engagement with said second pipe, said coupling means comprising a threaded portion integral with said second sealing member.

25. In a pipe union, a pair of pipes having adjacent terminal portions; a pair of coaxial inner tubular sealing members consisting of radially compressible material and each snugly receiving the terminal portion of one of said pipes, each inner sealing member having a leading end and a peripheral surface provided with ribs and, to enhance the compressibility thereof, with axially extending open grooves which have open ends located at said leading end, one of said inner sealing members having an end portion extending beyond the terminal portion of said one pipe and abutting against the terminal portion of the other pipe and said grooves extending at least along said portion of said peripheral surface; a pair of coaxial outer tubular sealing members each having a conical internal surface snugly receiving at least a portion of one of said peripheral surfaces; and coupling means operatively connected with said other pipe and with said outer sealing members for urging said end portion into sealing engagement with said other pipe and for urging said leading end of said inner sealing members deeper into the respective outer sealing members so as to compress said inner sealing members into sealing engagement with the terminal portion of said one pipe.

26. A structure as set forth in claim 25, wherein the outer sealing member which surrounds said one inner sealing member is integral with the other inner sealing member.

27. In a pipe union, a pair of pipes having adjacent terminal portions; a pair of coaxial inner tubular sealing members consisting of radially compressible material and snugly receiving the terminal portion of one of said pipes, each of said inner sealing members having a leading end and a peripheral surface provided with elongated ribs and, to enhance the compressibility thereof, with axially extending open grooves which have open ends located at said leading end; a pair of coaxial outer tubular sealing members each having a conical internal surface snugly receiving at least a portion of one of said peripheral surfaces, one of said outer sealing members having an end portion extending beyond the terminal portion of said one pipe and abutting against the terminal portion of the other pipe and said grooves extending at least along said portion of said peripheral surface; and coupling means operatively connected with said other pipe, with the other outer sealing member and with that inner sealing member which is surrounded by said one outer sealing member for urging said end portion in sealing engagement with said other pipe and for simultaneously urging said leading end of said inner sealing members deeper into the corresponding outer sealing members to compress said inner sealing members into sealing engagement with the terminal portion of said one pipe.

28. A structure as set forth in claim 27, wherein said inner sealing members form an integral unit and wherein said unit comprises an annular flange which is engaged by said coupling means.

29. A structure as set forth in claim 28, wherein the peripheral surfaces of said inner sealing members are of conical outline and wherein the diameters of said peripheral surfaces diminish toward the respective axial ends of said unit.

30. A structure as set forth in claim 29, wherein the distribution of ribs and grooves on one of said inner sealing members is different from the distribution of ribs and grooves on the other inner sealing member.

31. In a pipe union, a pair of coaxial pipes having adjacent terminal portions; a pair of abutting coaxial inner tubular sealing members each snugly receiving one of said terminal portions, said inner sealing members consisting of radially compressible material and each thereof having a leading end and a peripheral surface provided with elongated ribs and, to enhance the compressibility thereof, with axially extending open grooves, which have open ends located at said leading end; a pair of outer tubular sealing members each having a conical internal surface snugly receiving at least a portion of one of said peripheral surfaces and said grooves extending at least along said portion of said peripheral surface; and coupling means operatively connected with said outer sealing members for urging said inner sealing members into sealing engagement with each other and for simultaneously urging said leading end of said inner sealing members deeper into the respective outer sealing members so as to compress said inner sealing members into sealing engagement with the respective terminal portions.

32. A structure as set forth in claim 31, wherein said coupling means comprises outwardly extending flanges provided on said outer sealing members and means for detachably connecting said flanges to each other.

33. A structure as set forth in claim 31, wherein one of said inner sealing members has an end face provided with an annular recess and the other inner sealing member comprises an annular projection which extends into said recess to provide an annular seal along said end face.

34. A structure as set forth in claim 31, wherein said peripheral surfaces are of conical outline and diverge in directions toward each other.

35. A structure as set forth in claim 31, wherein said coupling means comprises an externally threaded portion provided on one of said outer sealing members and a cap nut overlying the other outer sealing member and meshing with said threaded portion.

36. In a pipe union, a first pipe having a terminal portion provided with a smooth external surface; a first tubular sealing member snugly receiving said terminal portion and having a smooth internal surface, a leading end and a conical peripheral surface, said first sealing member consisting of radially compressible metallic material and said peripheral surface being provided with elongated ribs and, to enhance the compressibility thereof, with axially extending open grooves which have open ends located at said leading end; a second tubular sealing member having a conical internal surface snugly receiving at least a portion of said peripheral surface, said second sealing member consisting of metallic material and one of said sealing members having an end portion extending beyond said terminal portion and said grooves extending at least along said portion of said peripheral surface; a second pipe having an end face abutting against said end portion; and disengageable coupling means operatively connected with said second pipe and with one of said sealing members for urging said end face in sealing engagement with said end portion and for simultaneously urging said leading end of said first sealing member deeper into said second sealing member so as to compress said first sealing member within the elastic limits of its material and into sealing engagement with the external surface of said terminal portion.

References Cited

UNITED STATES PATENTS

| | | |
|---|---|---|
| 2,585,453 | 2/1952 | Gallagher et al. |
| 2,320,813 | 1/1943 | Cowles _____ 285—382.7 X |
| 2,351,363 | 6/1944 | Parker et al. ____ 285—382.7 X |
| 2,490,620 | 12/1949 | Cole et al. _____ 285—382.7 X |

FOREIGN PATENTS

| | | |
|---|---|---|
| 1,847,647 | 3/1962 | Germany. |
| 503,475 | 6/1951 | Belgium. |

EDWARD C. ALLEN, *Primary Examiner.*

D. W. AROLA, *Assistant Examiner.*